UNITED STATES PATENT OFFICE.

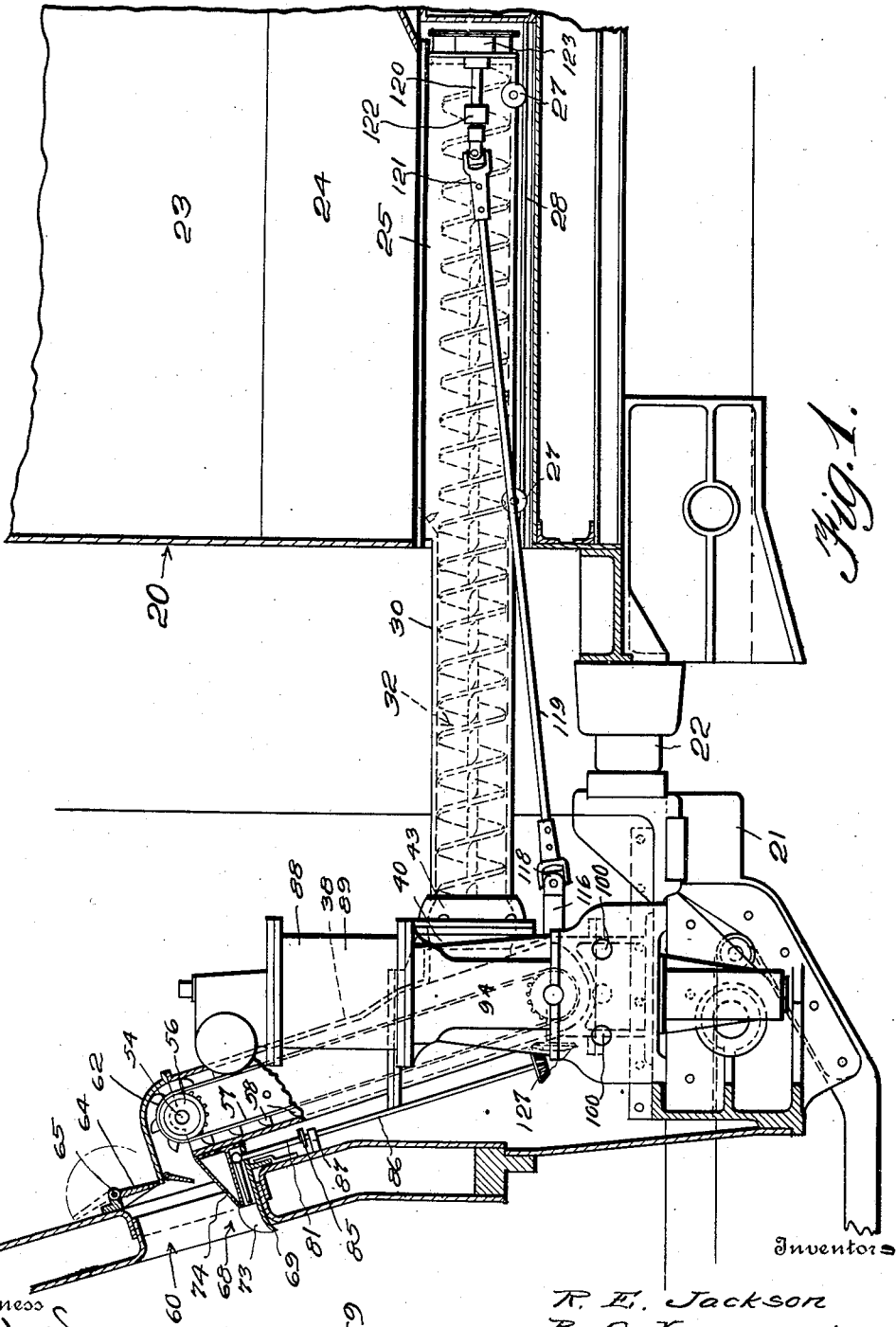

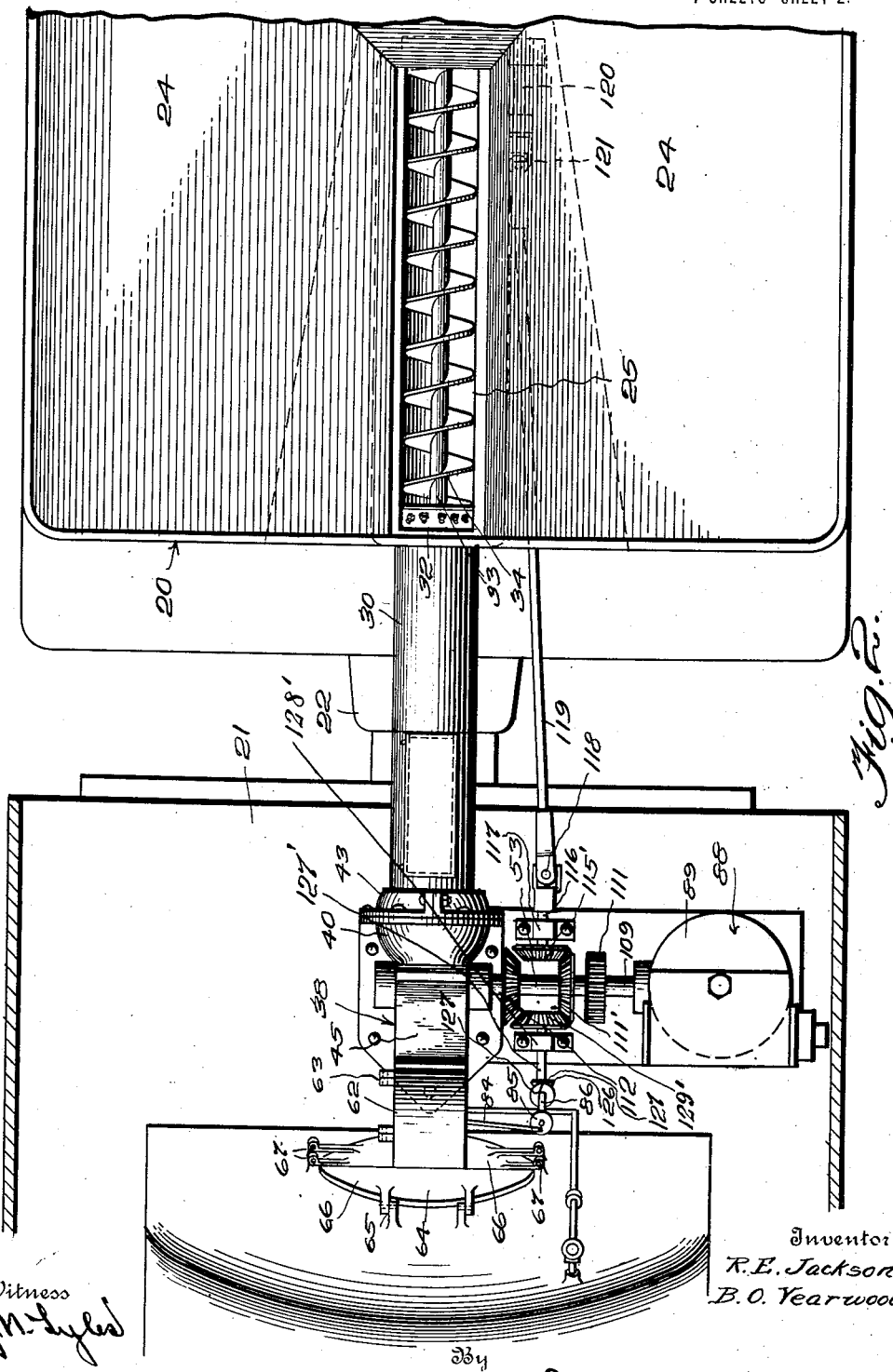

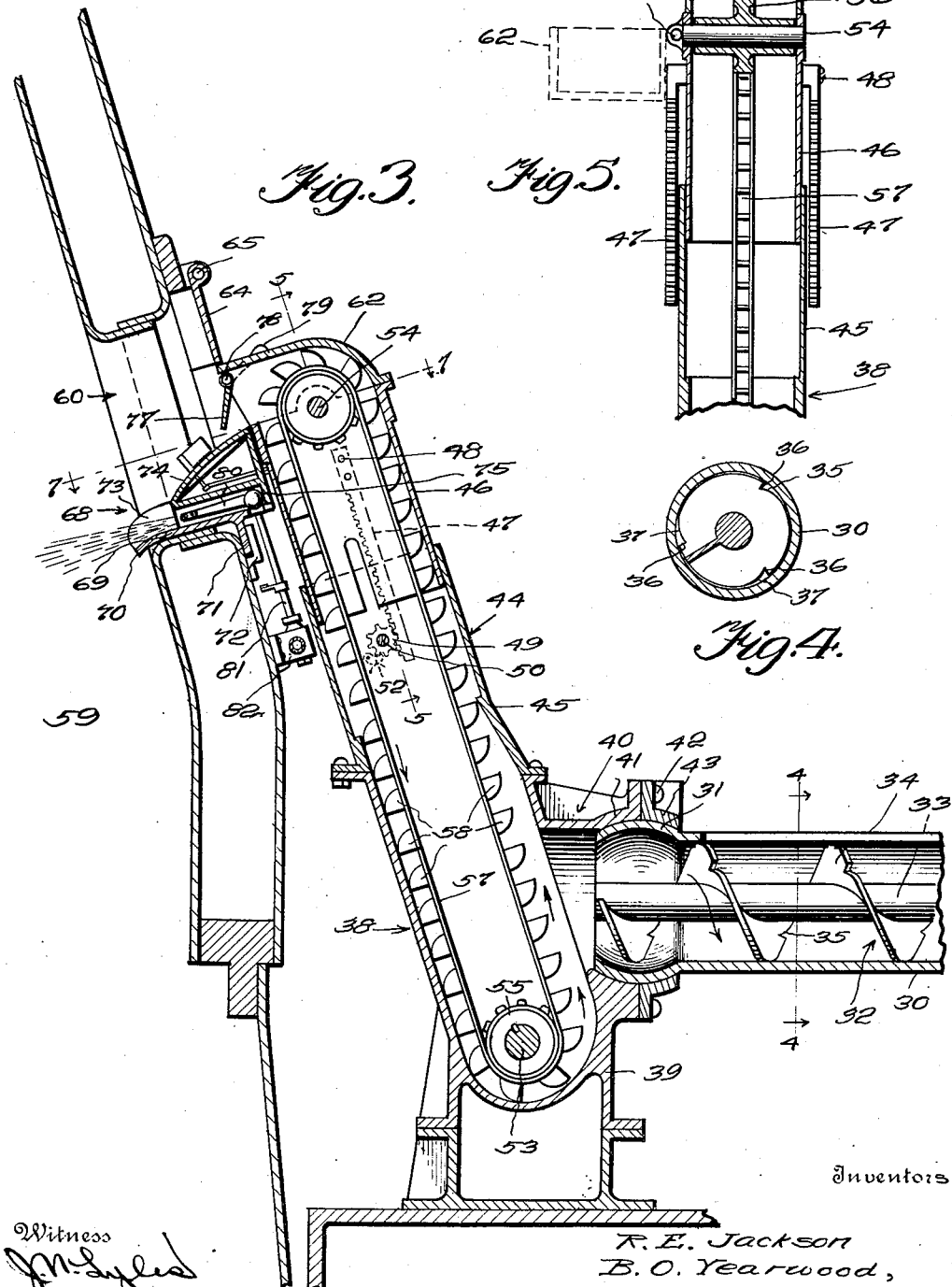

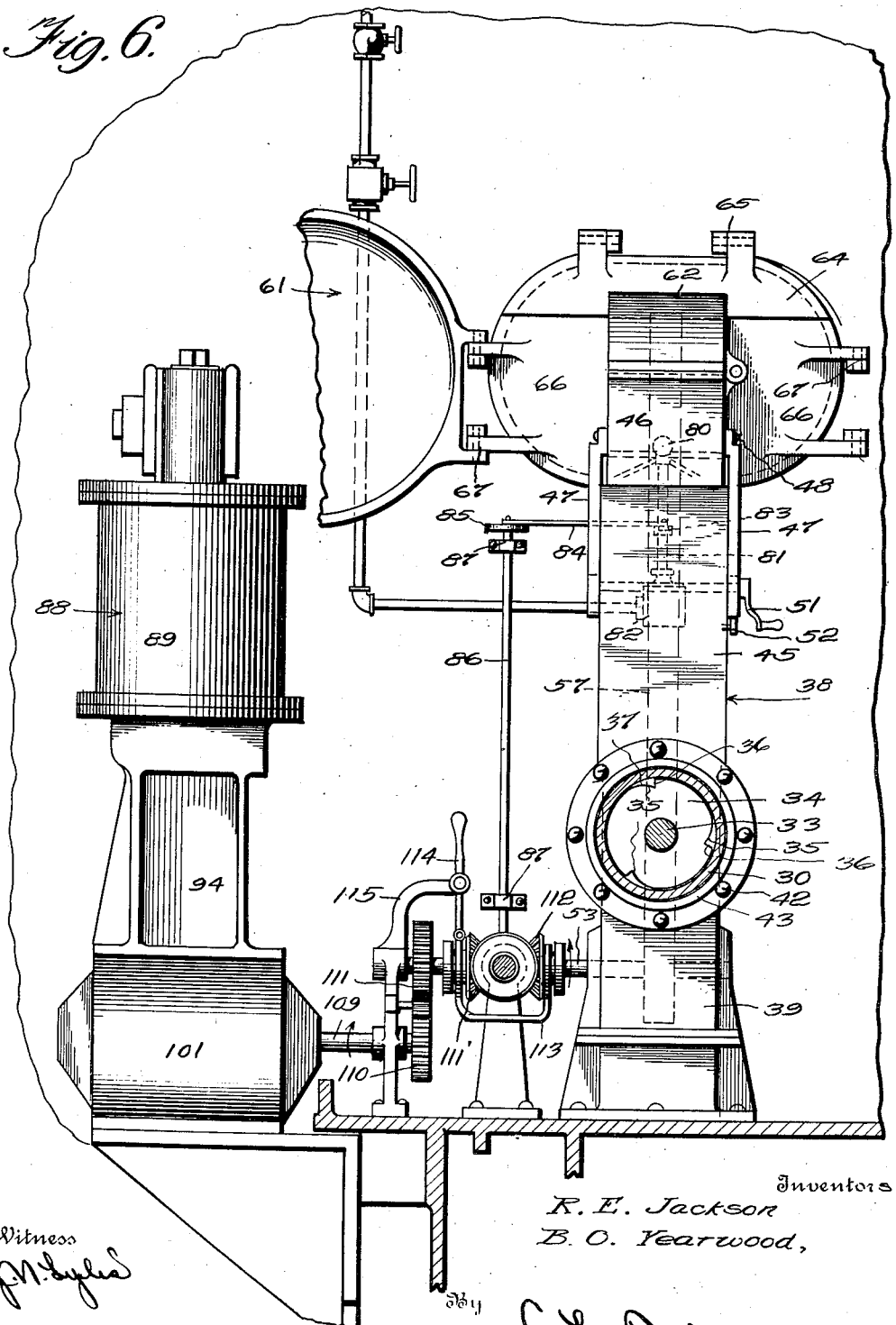

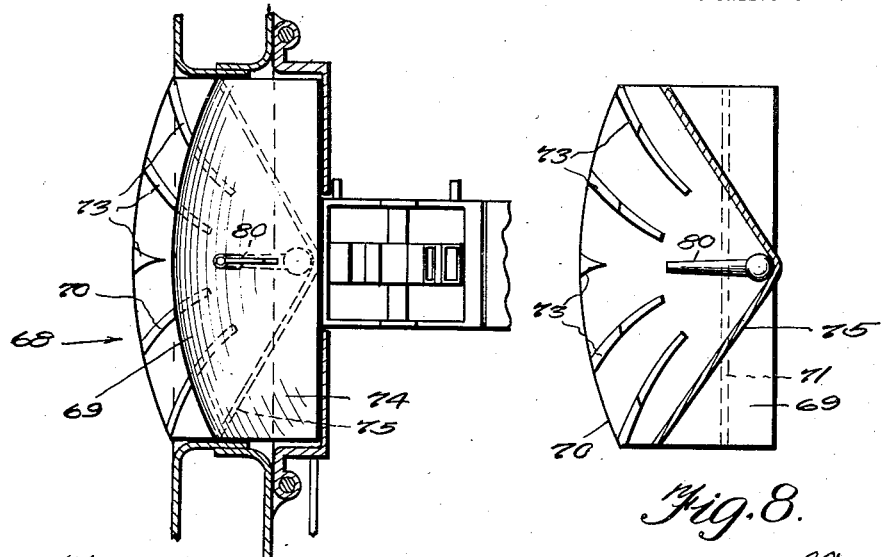

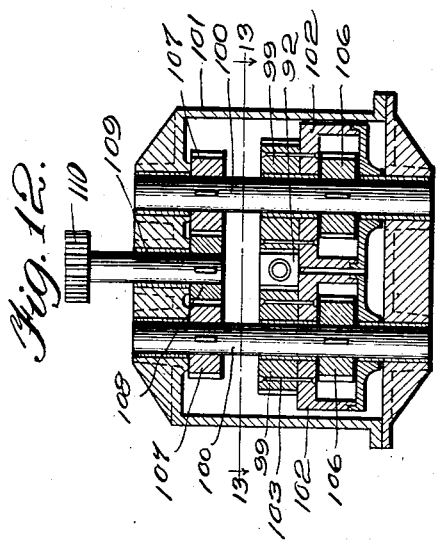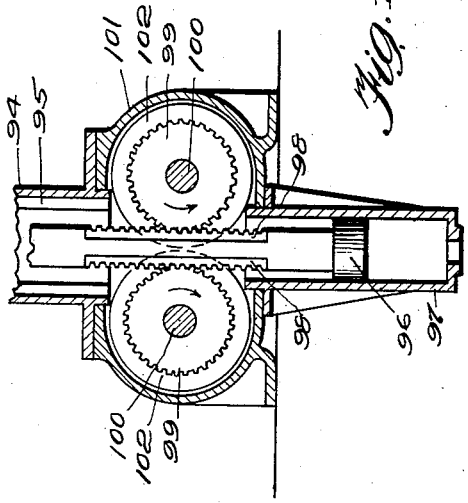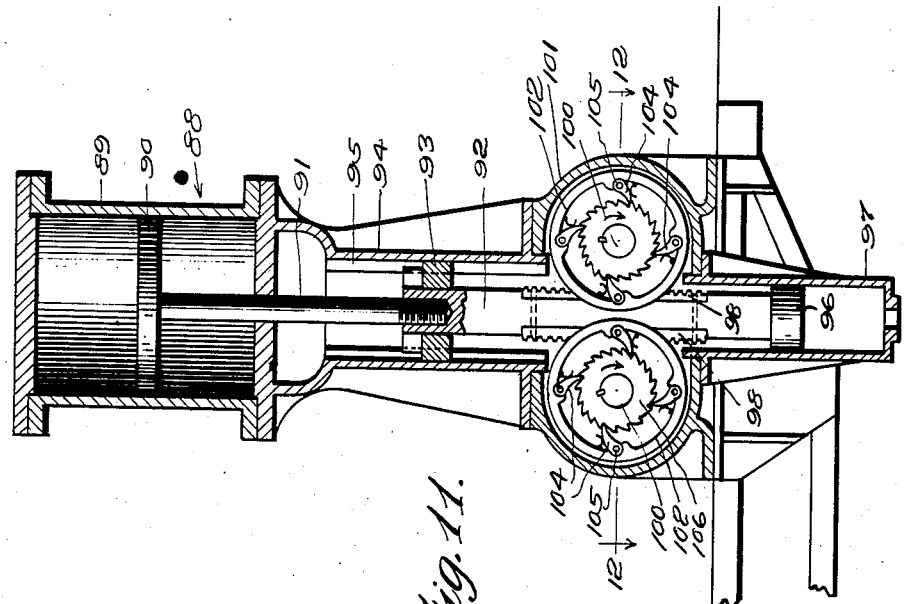

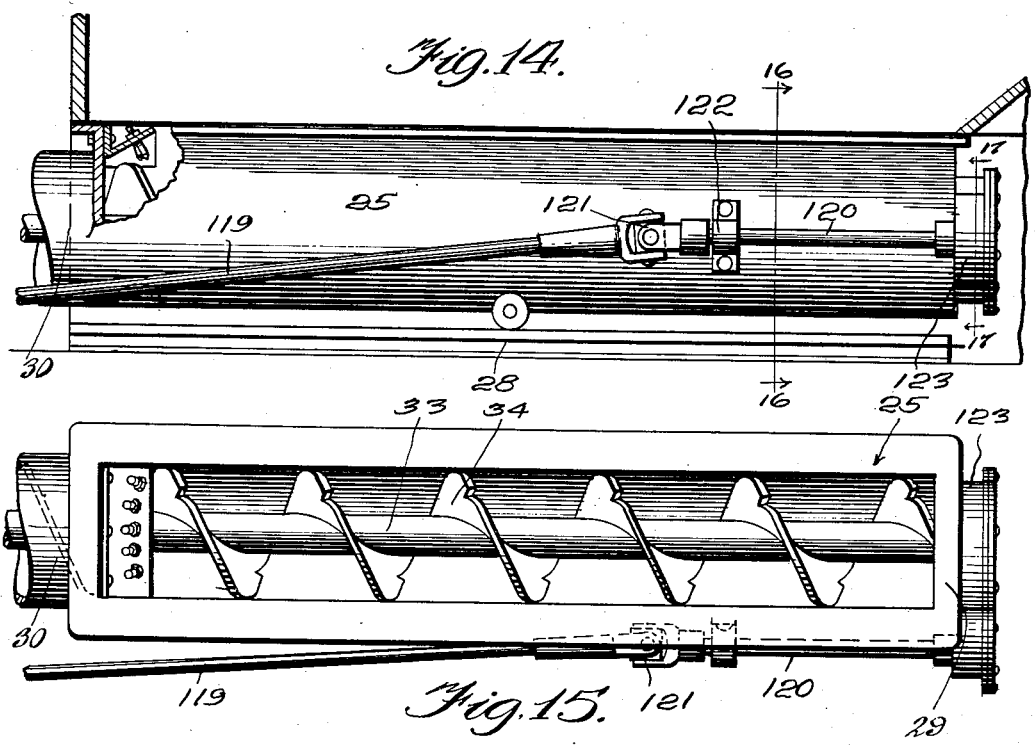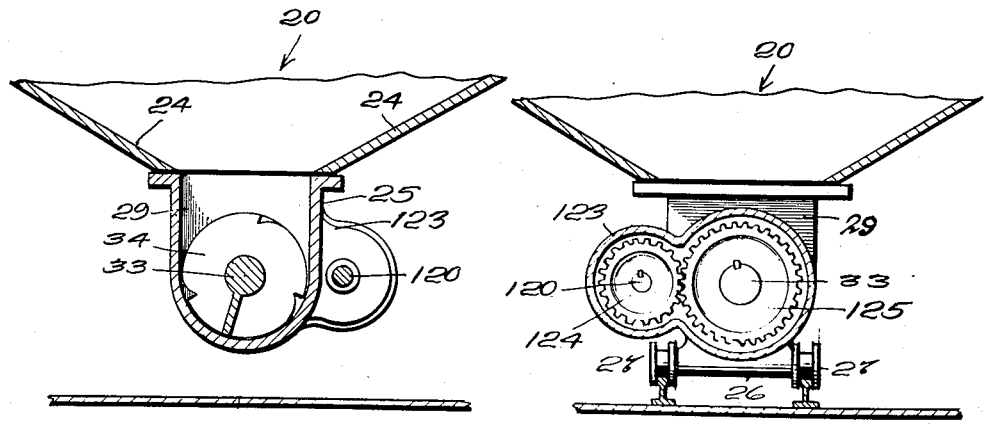

ROBERT E. JACKSON AND BYRD O. YEARWOOD, OF PRINCETON, WEST VIRGINIA.

MECHANICAL STOKER.

1,319,004.          Specification of Letters Patent.          Patented Oct. 14, 1919.

Application filed December 18, 1917. Serial No. 207,755.

*To all whom it may concern:*

Be it known that we, ROBERT E. JACKSON and BYRD O. YEARWOOD, citizens of the United States, residing at Princeton, in the county of Mercer and State of West Virginia, have invented certain new and useful Improvements in Mechanical Stokers, of which the following is a specification.

The present invention relates to mechanical stokers, for use in connection with railway locomotives, marine furnaces, etc., while not necessarily restricted to this use.

Important objects of the invention are: to provide a mechanical stoker of the above mentioned character, which is thoroughly practical; to provide means whereby the fuel in the tender magazine, or other fuel holding apparatus, is crushed or broken up, upon entering the conveyer trough; to provide means to feed or advance the crushed or broken fuel, to the fire box of the furnace, in proper quantities, thereby obtaining a constant regulated supply without overfeeding; to provide means for maintaining the crushed or broken up fuel in a suitably divided or separated condition, during its feeding travel, thereby avoiding liability of the fuel becoming packed or clogged; to provide means for suitably distributing the fuel in the fire box, upon its introduction therein; to provide means whereby parts of the stoker apparatus may be shifted to a position out of the way of the door opening of the fire-box, so that the engine may be manually fired in the usual manner, upon the apparatus becoming inoperative; to provide apparatus of the above mentioned character which is adapted for instalment upon a railway locomotive, without cutting holes in the boiler head or the like; and to provide novel and simple driving means or transmission for various parts of the apparatus.

Other objects and advantages of the invention will be apparent during the course of the following description.

In the accompanying drawings forming a part of this specification and in which like numerals are employed to designate like parts throughout the same, Figure 1 is a side elevation of apparatus embodying our invention, Fig. 2 is a plan view of the same, Fig. 3 is an enlarged central vertical sectional view through an elevating conveyer, and associated elements, Fig. 4 is a transverse sectional view taken on line 4—4 of Fig. 3, Fig. 5 is a longitudinal sectional view taken on line 5—5 of Fig. 3, Fig. 6 is an end elevation of the apparatus, parts being shown in section, Fig. 7 is a horizontal sectional view taken on line 7—7 of Fig. 3, Fig. 8 is a plan view of the fuel distributing apparatus, part in section, and parts omitted, Fig. 9 is a perspective view of the same, Fig. 9ª is a perspective view of a stationary nozzle, Fig. 10ª is a horizontal section through the same, Fig. 10 is a perspective view of an inclined fuel guide, included in the distributing apparatus.

Fig. 11 is a central vertical sectional view through an engine, and associated elements, employed in operating the stoker apparatus, Fig. 12 is a horizontal sectional view taken on line 12—12 of Fig. 11, Fig. 13 is a vertical sectional view taken on line 13—13 of Fig. 12, Fig. 14 is a side elevation of the conveyer trough, Fig. 15 is a plan view of the same, Fig. 16 is a transverse sectional view taken on line 16—16 of Fig. 14, and, Fig. 17 is a transverse section taken on line 17—17 of Fig. 14.

In the drawings, wherein for the purpose of illustration is shown a preferred embodiment of our invention, attention being called first to Figs. 1, 2, 3, 14, 15, 16 and 17, the numeral 20 designates the tender of the railway locomotive, connected with the engine 21, by means of the usual coupler 22.

The tender 20 is provided with a fuel magazine 23, having tapered sides 24, as shown more clearly in Fig. 16, for directing the fuel, such as coal, into a conveyer-trough 25. This conveyer trough is supported by axles 26, secured thereto, having flanged wheels 27, pivoted thereto. These flanged wheels travel upon track rails 28, arranged within the lower portion of the tender 20, as clearly shown in Fig. 1. It is thus apparent that the conveyer-trough 25 is capable of partaking of restricted longitudinal movements.

The rear end of the conveyer-trough 25 is closed by an end 29, and its forward end is provided with a tubular portion or extension 30 forming a continuation of the conveyer-trough, and this extension, as clearly shown in Fig. 3, is provided at its discharge end with a spherically curved portion 31, for the purpose to be described. Operating within the conveyer-trough 25 and the tubular extension 30 thereof is a spiral conveyer 32, including a shaft 33 and a spiral vane 34. The rear end of the shaft 33 is journaled through the end 29, and is rotatable therein, but held against perceptible longitudinal movement. The spiral vane 34 is provided near its peripheral edge with notches 35, having their forward edges 36 arranged at substantially a right angle to the edge of the vane while their rear edges 37 are inclined. The function of the notches 35 is to suitably break up the coal or other fuel as it enters the conveyer-trough, and passes therethrough.

The numeral 38 designates an elevating conveyer apparatus, as a whole, which is carried by the engine 21. This elevating conveyer apparatus comprises a stationary hopper 39, provided upon its rear side with a coupling 40, having a spherically curved portion 41, to which is attached, by means of bolts 42 or the like, a coacting spherically curved portion 43. The portions 41 and 43 form a spherically curved member, for the reception of the spherically curved member 31, whereby the tubular portion 30 of the conveyer-trough has a universal connection with the coupling 40. It is thus apparent that on account of this universal connection and the fact that the conveyer-trough can move longitudinally within restricted distances, the relative movements between the engine and tender, may occur, without in any way injuring or impairing the action of the apparatus. It is also apparent that the spiral conveyer 32 functions to feed the properly crushed or broken fuel into the hopper 39.

Secured to the upper end of the hopper 39 is a longitudinally-adjustable tubular casing 44, including telescoping sections 45 and 46. As clearly shown in Fig. 5, rack bars 47 are attached to the section 46, at 48, and these rack bars are engaged by gears 49, which are rigidly secured to a transverse rotatable shaft 50. The shaft 50 (see also Fig. 6) is journaled through the lower casing section 45 and is provided at one end with a hand crank 51, to turn the same. A dog 52 is pivoted near the hand crank 51, to engage the gear 49, and prevent improper rotation thereof in one direction.

The numeral 53 designates a transverse driving shaft, extending through the lower portion of the hopper 39, as shown in Figs. 1, 2, 3 and 6. The means to drive the shaft 53 will be described hereinafter. Journaled through the opposite sides of the upper casing section 46, is a stub shaft 54, shown more clearly in Fig. 5. Rigidly secured to the shaft 53 is a sprocket wheel 55, and a sprocket wheel 56 is carried by the shaft 54. These sprocket wheels are engaged by an endless sprocket chain 57, carrying conveyer buckets 58. The conveyer buckets 58, sprocket chain 57, and associated elements constitute an elevating endless belt conveyer.

As more clearly shown in Fig. 3, the fire box 59 of the engine is provided with the usual door opening 60, adapted to be covered by a door 61, which is moved to an open position, out of the way, when our apparatus is in use. As clearly shown in Fig. 3, the upper end of the elevating conveyer is arranged to discharge the fuel into the firebox through the door opening 60, but if the apparatus should become inoperative, the casing section 46 may be lowered, by manipulation of the head crank 51, whereby the upper end of the elevating conveyer will be moved downwardly to a lowered position, so that it will not obstruct the door opening 60 and fuel may be passed through the same by the firemen, in the usual manner.

As clearly shown in Figs. 2, 3 and 6, the upper end of the casing section 46 is normally closed by a lid or cover 62, hinged thereto as shown at 63. When the casing section 46 is lowered, as above indicated, the cover 62 is swung to the outer position, as indicated in Fig. 5. Arranged near and above the cover 62 is a door section 64, hinged at 65, to the boiler of the engine. Arranged upon opposite sides of the casing section 46 are horizontally swinging door sections 66, hinged at 67. When the door sections 64 and 66 are in the closed position, they coact with the casing section 46 and cover 62 thereof, for substantially completely closing the door opening 60. When the casing section 46 is lowered to the inactive position, as hereinbefore indicated, the door 61 may then be employed to cover the opening 60, and this door 61 is preferably suitably shaped or constructed to fulfil this function.

Arranged within the door opening 60 is fuel distributing apparatus, designated as a whole by the numeral 68. This apparatus comprises a lower plate 69, the forward edge 70 of which is preferably curved, as clearly shown in Figs. 7 and 9. Near its rear end, the plate 69 is provided with a depending flange 71, adapted for insertion within brackets 72, within which the same is held and may be removed therefrom when desired. As more clearly shown in Fig. 9, the plate 69 is provided with a plurality of spaced radial forwardly diverging ribs or flanges 73. Arranged at the rear ends of the ribs or flanges 73 is a preferably hollow inclined guide plate 74 which is also spherically curved, with its convex side arranged outermost, and provided upon its lower side with a depending V-shaped flange 75. This V-shaped flange receives therein the ribs or flanges 73, as clearly indicated in Fig. 8. The V-shaped flange 75 constitutes a supporting means for the guide plate 74 and forms a chamber, having communication with the spaces between the flanges 73. The guide plate 74 contacts with the casing section 46 and is thereby retained against rearward displacement. When the casing section 46 is lowered, as hereinbefore described, it is obvious that the guide plate 74 may be readily removed, whereby the door opening 60 will not be obstructed. A deflector plate 77 is arranged above the guide plate 74, and is rigidly secured to a rock-shaft 78 whereby it may be moved to different angular positions. The rock-shaft 78 is adapted to be turned by a crank 79, which may be locked in a desired angular position, by any suitable means (not shown). It is thus apparent that the deflector plate 88 prevents the buckets 58 from throwing the fuel through the opening 60, such fuel being directed downwardly upon the inclined guide plate 74, from which it passes on to the plate 69, between the flanges or ribs 73.

The fuel distributing apparatus comprises a horizontally swinging nozzle 80, positioned near and rearwardly of the ribs or flanges 73 and screw-threaded within the upper end of an upstanding pipe 81, adapted to turn upon its longitudinal axis. Steam or compressed air is supplied into the pipe 81 from a suitable source through the coupling 82 of any well known or preferred type. The pipe 81 is rocked by means of a crank 83, having pivotal connection with a pitman 84, extending laterally for pivotal connection with a crank disk 85, as shown. This crank disk is rigidly secured to a vertical shaft 86, journaled through bearings 87. Means to drive the shaft 86 will be described hereinafter.

In Figs. 9ª and 10ª, is shown a stationary steam nozzle, comprising a tubular body portion 80', screw-threaded into the upper end of the pipe 81. Formed upon the forward end of the body portion is an enlarged head 81', provided with forwardly diverging apertures 82', as shown. When the stationary nozzle is employed it is located in the central position, rearwardly of the ribs 73, corresponding to the location of the nozzle 80, in Fig. 9.

Arranged above the guide plate 74 is a swinging deflector 74', rigidly secured to a vertical rod 75', having a crank 76', rigidly secured to its lower end. This crank is swung by a pitman 77', manually moved by any suitable means. By shifting the deflecting plate in either direction, the volume of coal supplied to one side of the plate 74 may be regulated.

The numeral 88 designates an engine, preferably a steam engine of the reciprocatory type. This engine includes a cylinder 89, within which a piston 90 is mounted to reciprocate. The usual valve mechanism (not shown) is employed for controlling the inlet and exhaust of steam to the opposite ends of the cylinder 89. Connected with the piston 90 is a depending rod 91, having connection with a vertical reciprocatory bar 92. This bar carries a disk cross head 93, operating within a tubular guide 94 having ribs 95, operating within grooves in the disk cross head. At its lower end the bar 92 has a second disk cross head 96 secured thereto, and adapted to operate within a tubular guide 97. Arranged upon the opposite edges of the bar 92 and secured thereto by any suitable means are racks 98, in permanent engagement with gears 99, for rotating the same in opposite directions. The gears 99 are rotatable upon transverse shafts 100, journaled in the opposite sides of a gear casing 101. The gears 99 have flanged wheels 102, bolted or otherwise rigidly attached thereto, as shown at 103. These flanged wheels 102 are provided with sets of pawls 104, pivoted thereto as shown at 105. The pawls face in the same direction, and are disposed to engage with ratchet wheels 106, which are rigidly secured to the shafts 100. Rigidly connected with the shafts 100 are gears 107, engaging a gear 108, arranged therebetween. The gear 108 is rigidly secured to a stub shaft 109, having a gear 110 rigidly secured thereto. The gear 110 engages a gear 110', engaging a gear 111, rigidly secured to the shaft 53. In view of the foregoing description, it is obvious that when the bar 92 moves downwardly, it will turn the gears 99 and the flanged wheels 102 secured thereto, in opposite directions, as indicated by the arrows thereon. The pawls carried by the flanged wheel 102 at the left, in Fig. 11, will turn the ratchet wheel 106 in the direction of the arrow thereon, while the pawls 104 carried by the flanged wheel 102 to the right will trip upon the ratchet wheel 106. The rotation of the ratchet wheel 106 to the left is transmitted to the shaft 110 to the left, driving the gear 107, carried thereby, which in turn drives the gear 108. This rotation is imparted to the shaft 53, as is obvious. Upon the upstroke of the bar 92, the ratchet wheel 106 to the right will be turned in the direction of its arrow, while the other ratchet wheel will be idle. The shaft 100, to the right is rotated, which rotation is imparted to the shaft 109 through the medium of the gears 107 and 108. The shaft 109 is therefore turned in the same direction.

The shaft 53 carries bevel gears 111' and 112, splined upon the shaft, so that they are capable of being shifted longitudinally upon the shaft to rotate therewith. These gears are simultaneously shifted longitudinally by means of a frame 113, having a loose connection therewith, and pivoted to a hand lever 114, pivotally supported at 115. Arranged between the gears 111' and 112 is a bevel gear 115', rigidly secured to a stub shaft 116, journaled through stationary bearing 117. A universal joint 118 serves to pivotally connect one end of the stub shaft 116 with a driving shaft 119, extending rearwardly for connection with a stub shaft 120, through the medium of a universal joint 121. The stub shaft 120 is journaled through a bearing 122 and projects into a gear casing 123. Within this gear casing is a small gear 124, rigidly secured to the shaft 120, and engaging a large gear 125, rigidly secured to the rear end of the shaft 33. It is thus apparent that the rotation of the shaft 53 is employed to drive the conveyer shaft 33 but this rotation is reduced. Attention is called to the fact that the elevating conveyer is driven at a greater speed than the spiral conveyer, thereby eliminating liability of overfeeding of the elevating conveyer.

The shaft 86 has a bevel gear 126 rigidly secured thereto. This bevel gear engages a bevel gear 127, rigidly attached to a shaft 127', to rotate the same. The shaft 127' is journaled in a bearing 128' and has a bevel gear 129', rigidly secured thereto. This bevel gear 129' is arranged between the bevel gears 111' and 112, to be alternately engaged thereby.

The operation of the apparatus is as follows:

The engine 88 is operating when it is desired to have the mechanical stoker operate, and it is obvious that the engine may be started or stopped, in the usual manner. The shaft 109 is rotated in the direction of its arrow, which rotation is imparted to the shaft 53, which rotates in the direction of its arrow. The shaft 53 drives the conveyer 57 in the direction of its arrow, whereby the coal or the like is elevated and discharged upon the inclined guide plate 74.

By properly shifting the lever 114 the spiral conveyer may be driven in the direction of its arrow, to feed the coal into the hopper 39, such coal being suitably crushed or broken by the teeth or notches 35. Should the coal become packed or clogged in the spiral conveyer, such packing may be relieved by operating the conveyer in an opposite direction, which can be accomplished by swinging the lever 114 in a suitable direction.

The coal from the conveyer 57 falls upon the inclined guide plate 74 and discharges upon the plate 70, between the flanges or ribs 73. The pipe or nozzle 80 is now oscillating rearwardly of the flanges 73, and thus serves to force or blow the coal into the fire box, such coal passing therein in forwardly diverging streams, to be evenly distributed in the fire-box.

If the apparatus should become impaired or inoperative, the crank 51 would be turned to rotate the shaft 50, whereby the casing section 46 would be lowered to a point near or beneath the door opening 60. The inclined guide plate 74 could then be removed. The upper portion of the apparatus would not therefore obstruct the fire-box opening 60, and coal could be fed through the opening 60 in the usual manner.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. In a stoker for a railway locomotive, a hopper adapted to be rigidly secured to the rear platform of the locomotive, an upstanding conveyer casing secured to the hopper and extending upwardly across the door opening of the fire box of the locomotive for a substantial distance, said casing embodying upper and lower sections, means to vertically adjust the upper section with relation to the lower section, a lower plate removably mounted within the door opening of the fire box and having forwardly diverging flanges formed upon the upper surface thereof, an inclined guide plate removably mounted upon the lower plate, said lower plate and inclined guide plate being adapted to be removed from the door opening when the upper casing section is lowered, and fluid pressure supply means operating in conjunction with the flanges.

2. The combination with a door opening, of a fire box of a railway locomotive, of a vertically swinging door section hinged at the top of the door opening, a pair of horizontally swinging door sections hinged at the opposite ends of the door opening and having their ends spaced to provide an opening, a conveyer casing provided at its upper end with a vertically swinging cap adapted when in the upper closed position to form a continuation of the same whereby the upper end of the casing is adapted to discharge into the opening, a conveyer operating within the conveyer casing, and fuel distributing means arranged within said opening.

3. In a stoker for a railway locomotive, a fuel magazine arranged within the lower portion of the tender of the locomotive and having oppositely disposed inclined sides which converge downwardly providing a longitudinal passage, a substantially horizontal track secured in the tender beneath the passage and extending longitudinally of the passage, a substantially horizontal conveyer-trough arranged above and extending longitudinally of the track and having its top open to receive coal from the passage, wheels carried by the conveyer-trough and traveling upon the track, a closed tubular extension secured to the forward end of the conveyer-trough and projecting beyond the tender, said tubular extension being provided near its free end with a substantially horizontal spherically curved hollow head, a hopper secured to the rear portion of the engine and provided with a substantially horizontal spherically curved socket to receive the head, a conveyer operating within the conveyer-trough, and an elevating conveyer arranged to conduct the fuel from the hopper to the fire-box of the locomotive.

4. In a stoker for a railway locomotive, a downwardly discharging fuel magazine arranged within the tender of the locomotive and having an outlet passage, an approximately horizontal track carried by the tender and extending longitudinally thereof beneath the outlet passage, an approximately horizontal conveyer-trough arranged above and extending longitudinally of the track and having its top open to receive fuel from the outlet passage, said conveyer-trough projecting forwardly beyond the tender and provided near its free end with a substantially horizontal spherically curved hollow head, wheels carried by the conveyer-trough to engage the track, a hopper secured to the rear portion of the engine and provided with a substantially horizontal spherically curved socket to receive the head, a conveyer operating within the conveyer-trough, and an elevating conveyer to conduct the fuel from the hopper to the fire-box of the locomotive.

5. In a stoker for a railway locomotive, a hopper secured to the rear portion of the locomotive, an upstanding conveyer casing secured to the hopper and extending upwardly across the door opening of the fire-box of the locomotive for a substantial distance, said casing embodying upper and lower sections, means to move the upper section downwardly with relation to the lower section to assume a position approximately beneath said door opening, a supporting member arranged within said door opening and adapted to be removed therefrom when the upper section is lowered, fuel guide means carried by the supporting member, fluid pressure operated means carried by the supporting member to discharge the fuel into the fire-box of the locomotive, and a conveyer operating within the upstanding conveyer casing.

6. In a stoker for a railway locomotive, a hopper secured to the rear portion of the locomotive, an upstanding conveyer casing secured to the hopper and extending upwardly across the door opening of the fire-box of the locomotive for a substantial distance, said casing embodying upper and lower sections, means to move the upper section downwardly with relation to the lower section to assume a position near the bottom of the door opening whereby such door opening is approximately unobstructed, a fluid pressure operated apparatus mounted within the door opening and adapted to be removed therefrom when said upper section is shifted to the lower position, said fluid pressure operated apparatus being adapted to discharge the fuel into the fire-box of the locomotive, and a conveyer operating within the upstanding conveyer casing to feed the fuel from the hopper to the fluid pressure operated apparatus.

7. In a stoker for a railway locomotive, a fuel magazine arranged within the tender of the locomotive, an approximately horizontal conveyer trough extending longitudinally of the tender and receiving fuel from the fuel magazine, means whereby the conveyer trough is adapted to partake of longitudinal movements with relation to the tender, an approximately horizontal spherically curved hollow head connected with the forward end of the conveyer trough, a hopper secured to the rear portion of the engine and provided with an approximately horizontal spherically curved socket to receive the head, a conveyer operating within the conveyer trough, an upstanding conveyer casing secured to the hopper and extending upwardly across the door opening of the fire-box of the locomotive for a substantial distance, said casing embodying upper and lower sections, means to move the upper section downwardly with relation to the lower section to assume a position near the bottom of the door opening whereby such door opening is approximately unobstructed, a fluid pressure operated apparatus mounted within the door opening and adapted to be removed therefrom when said upper section is shifted to the lower position, said fluid pressure operated apparatus being adapted to discharge the fuel into the fire box of the locomotive, and a conveyer operating within the upstanding conveyer casing to feed the fuel from the hopper to the fluid pressure operated apparatus.

In testimony whereof we affix our signatures in presence of two witnesses.

ROBERT E. JACKSON.
BYRD O. YEARWOOD.

Witnesses:
W. P. DAVIS,
JOS. H. EVANS.